(12) United States Patent
Heller et al.

(10) Patent No.: US 8,665,934 B2
(45) Date of Patent: *Mar. 4, 2014

(54) MULTIMODE MULTICARRIER MODEM SYSTEM AND METHOD OF COMMUNICATION OVER THE SAME

(71) Applicant: Intel Corporation, Santa Clara, CA (US)

(72) Inventors: Peter N. Heller, Somerville, MA (US); Edmund C. Reiter, Lincoln, MA (US); Michael A. Tzannes, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,703

(22) Filed: Apr. 19, 2013

(65) Prior Publication Data

US 2013/0272354 A1 Oct. 17, 2013

Related U.S. Application Data

(60) Continuation of application No. 13/364,561, filed on Feb. 2, 2012, now Pat. No. 8,472,509, which is a continuation of application No. 13/093,126, filed on Apr. 25, 2011, now Pat. No. 8,116,361, which is a continuation of application No. 12/783,815, filed on May 20, 2010, now Pat. No. 7,940,837, which is a continuation of application No. 11/929,154, filed on Oct. 30, 2007, now Pat. No. 7,746,923, which is a division of application No. 11/109,646, filed on Apr. 20, 2005, now Pat. No. 7,738,542, which is a division of application No. 09/862,492, filed on May 23, 2001, now abandoned.

(60) Provisional application No. 60/206,502, filed on May 23, 2000.

(51) Int. Cl.
*H04B 1/38* (2006.01)
*H04L 5/16* (2006.01)

(52) U.S. Cl.
USPC .................. 375/222; 370/254; 370/419

(58) Field of Classification Search
USPC ............ 375/220, 222; 370/254, 419; 704/200
See application file for complete search history.

(56) References Cited

U.S. PATENT DOCUMENTS 4,932,024 A 6/1990 Bonicioli et al.
5,537,435 A 7/1996 Carney et al.
(Continued)

FOREIGN PATENT DOCUMENTS

EP 0806852 11/1997
JP 05-327796 12/1993
(Continued)

OTHER PUBLICATIONS

Adriaensen et al., "Single Chip DMT-Modem Transceiver for ADSL," Alcatel Telecom (Microelectronics Department), IEEE, Sep. 1996, pp. 123-126.

(Continued)

*Primary Examiner* — Curtis Odom
(74) *Attorney, Agent, or Firm* — Jason H. Vick; Sheridan Ross, PC

(57) ABSTRACT

An alternative approach to coping with the ever increasing demand for faster communications hardware is to design modems that are capable of operating its speeds at a higher data rate than a speed required for a single port of the standard communication rate for that modem. Basically, by utilizing a resource manager, that directs the data in and out of the various portions of the modem in an orderly manner, keeping track of which of the ports is being operated at any given point in time, a standard single port modem can be reconfigured, for example, at an over clocked rate, to manipulate the data input and output of a modem.

6 Claims, 10 Drawing Sheets

(56) References Cited

U.S. PATENT DOCUMENTS

| | | | |
|---|---|---|---|
| 5,812,534 | A | 9/1998 | Davis et al. |
| 6,002,722 | A | 12/1999 | Wu |
| 6,005,873 | A | 12/1999 | Amit |
| 6,055,268 | A | 4/2000 | Timm et al. |
| 6,345,071 | B1 * | 2/2002 | Hamdi ............................ 375/222 |
| 6,480,748 | B1 | 11/2002 | Gerszberg et al. |
| 6,560,225 | B1 | 5/2003 | Czajkowski et al. |
| 6,584,074 | B1 | 6/2003 | Vasamsetti et al. |
| 6,640,239 | B1 | 10/2003 | Gidwani |
| 6,959,036 | B1 | 10/2005 | Rezvani et al. |
| 7,075,941 | B2 | 7/2006 | Liu |
| 7,266,109 | B1 | 9/2007 | Rosenstein et al. |
| 7,738,542 | B2 | 6/2010 | Heller et al. |
| 7,746,923 | B2 | 6/2010 | Heller et al. |
| 7,940,836 | B2 | 5/2011 | Heller et al. |
| 7,940,837 | B2 | 5/2011 | Heller et al. |
| 8,116,361 | B2 | 2/2012 | Heller et al. |
| 8,175,139 | B2 | 5/2012 | Heller et al. |
| 8,472,509 | B2 * | 6/2013 | Heller et al. ................... 375/222 |
| 2001/0030664 | A1 | 10/2001 | Shulman et al. |
| 2001/0047434 | A1 | 11/2001 | Liu |
| 2002/0010779 | A1 | 1/2002 | Heller et al. |
| 2012/0134396 | A1 | 5/2012 | Heller et al. |
| 2012/0219046 | A1 | 8/2012 | Heller et al. |

FOREIGN PATENT DOCUMENTS

| | | |
|---|---|---|
| JP | 06-104939 | 4/1994 |
| JP | 1998-075279 | 3/1998 |
| JP | 2000-049899 | 2/2000 |
| KR | 1998-13165 | 4/1998 |
| WO | WO 00/01136 | 1/2000 |

OTHER PUBLICATIONS

Wiese et al., "Programmable Implementations of xDSL Transceiver Systems," IEEE Communications Magazine, May 1, 2000, vol. 38(5), pp. 114-119.
ANSI T1.413-1998, "Network and Customer Installation Interfaces—Asymmetric Digital Subscriber Line (ADSL) Metallic Interface," Draft American National Standards for Telecommunications, 1998, i.e., T1.413 Issue 2, 270 pages.
ITU-T Recommendation G.992.1, "Asymmetric digital subscriber line (ADSL) transceivers," Telecommunication Standardization Sector of ITU, Jun. 1999, 256 pages.
ITU-T Recommendation G.992.2, "Splitterless asymmetric digital subscriber line (ADSL) transceivers," Telecommunication Standardization Sector of ITU, Jun. 1999, 179 pages.
International Search Report for International (PCT) Application No. PCT/US01/16540, mailed Feb. 26, 2002.
Written Opinion for International (PCT) Patent Application No. PCT/US01/16540, mailed Mar. 5, 2002.
International Preliminary Examination Report for International (PCT) Patent Application No. PCT/US01/16540, mailed May 28, 2002.
Official Action for Canadian Patent Application No. 2,408,159, mailed Sep. 15, 2008.
Official Action for Canadian Patent Application No. 2,408,159, mailed Mar. 30, 2009.
Official Action for Canadian Patent Application No. 2,408,159, dated Apr. 21, 2010.
Official Action for Canadian Patent Application No. 2,408,159, dated Dec. 6, 2010.
Notice of Allowance for Canadian Patent Application No. 2,408,159, dated Jul. 22, 2011.
Notice of Allowance for Canadian Patent Application No. 2,745,847, mailed Nov. 15, 2011.
Office Action for European Patent Application No. 01939258.8-2414, mailed Jan. 19, 2005.
Further Office Action for European Patent Application No. 01939258.8-2414, mailed Jan. 26, 2007.
Examination Report for European Patent Application No. 01939258.8-2414, mailed Jul. 28, 2008.
Extended European Search Report for European Patent Application No. 10012369.4, dated Dec. 6, 2010.
Official Action (including translation) for Japanese Patent Application No. 2001-586903, mailed Sep. 6, 2010.
Decision of Final Rejection for Japanese Patent Application No. 2001-586903, mailed May 2, 2011.
English Translation of the Preliminary Rejection for Korean Patent Application No. 2002-7015903, issued Feb. 12, 2007.
Official Action (including translation) for Korean Patent Application No. 2002-7015903, mailed Aug. 31, 2010.
Official Action (including translation) for Korean Patent Application No. 10-2010-7007892, mailed Jun. 15, 2010.
Notice of Refusal for Korean Patent Application No. 10-2010-7007892, mailed May 31, 2011.
Restriction Requirement for U.S. Appl. No. 09/862,492, mailed Jul. 27, 2004.
Official Action for U.S. Appl. No. 09/862,492, mailed Oct. 20, 2004.
Official Action for U.S. Appl. No. 11/109,646, mailed Sep. 5, 2006.
Official Action for U.S. Appl. No. 11/109,646, mailed May 17, 2007.
Official Action for U.S. Appl. No. 11/109,646, mailed Jul. 11, 2008.
Official Action for U.S. Appl. No. 11/109,646, mailed Jan. 8, 2009.
Official Action for U.S. Appl. No. 11/109,646, mailed Jun. 25, 2009.
Notice of Allowance for U.S. Appl. No. 11/109,646, mailed Dec. 24, 2009.
Supplemental Notice of Allowability for U.S. Appl. No. 11/109,646, mailed Jan. 25, 2010.
Official Action for U.S. Appl. No. 11/929,154, mailed May 13, 2008.
Official Action for U.S. Appl. No. 11/929,154, mailed Jan. 8, 2009.
Official Action for U.S. Appl. No. 11/929,154, mailed Jun. 11, 2009.
Notice of Allowance for U.S. Appl. No. 11/929,154, mailed Dec. 31, 2009.
Official Action for U.S. Appl. No. 12/783,815, mailed Sep. 27, 2010.
Notice of Allowance for U.S. Appl. No. 12/783,815, mailed Feb. 4, 2011.
Official Action for U.S. Appl. No. 13/093,126, mailed Oct. 14, 2011.
Notice of Allowance for U.S. Appl. No. 13/093,126 mailed Dec. 23, 2011.
Official Action for U.S. Appl. No. 13/364,561, mailed Jul. 20, 2012.
Notice of Allowance for U.S. Appl. No. 13/364,561, mailed Jan. 18, 2013.
Official Action for U.S. Appl. No. 12/685,389, mailed Sep. 14, 2010.
Notice of Allowance for U.S. Appl. No. 12/685,389, mailed Dec. 1, 2010.
Official Action for U.S. Appl. No. 12/966,592, mailed Mar. 17, 2011.
Official Action for U.S. Appl. No. 12/966,592, mailed Dec. 12, 2011.
Notice of Allowance for U.S. Appl. No. 12/966,592, mailed Mar. 28, 2012.
Official Action for U.S. Appl. No. 13/464,659, mailed Feb. 28, 2013.
Official Action for U.S. Appl. No. 13/464,659, mailed Aug. 13, 2013.

* cited by examiner

MULTIMODE MULTICARRIER MODEM SYSTEM AND METHOD OF COMMUNICATION OVER THE SAME

RELATED APPLICATION DATA

This application is a Continuation of U.S. application Ser. No. 13/364,561, filed Feb. 2, 2012, now U.S. Pat. No. 8,472,509, which is a Continuation of U.S. application Ser. No. 13/093,126, filed Apr. 25, 2011, now U.S. Pat. No. 8,116,361, which is a Continuation of U.S. application Ser. No. 12/783,815, filed May 20, 2010, now U.S. Pat. No. 7,940,837, which is a Continuation of U.S. application Ser. No. 11/929,154, filed Oct. 30, 2007, now U.S. Pat. No. 7,746,923, which is a Divisional of U.S. application Ser. No. 11/109,646, filed Apr. 20, 2005, now U.S. Pat. No. 7,738,542, which is a Divisional of U.S. application Ser. No. 09/862,492, filed May 23, 2001, which claims the benefit of and priority under 35 U.S.C. §119(e) to U.S. Patent Application Ser. No. 60/206,502, filed May 23, 2000, entitled "Multimode Multicarrier Modem Architecture," each of which are incorporated herein by reference in their entirety.

BACKGROUND OF THE INVENTION

1. Field of the Invention

This invention relates to communications technologies. In particular, this invention relates to a multimode multicarrier modem.

2. Description of Related Art

The role out of broadband services over telephone lines using Digital Subscriber Lines (DSL) technology is occurring around the globe. In order to achieve reliable communications over DSL links, a technique known as Discrete Multitone (DMT) modulation is used. Discrete Multitone Modulation has been standardized for DSL transmission by the ANSI standards body for full-rate ADSL (T1E1.4/97-007R6 Interface between network and customer installation Asymmetric Digital Subscriber Line (ADSL) metallic interface, Sep. 26, 1997, i.e., T1.413 Issue 2, incorporated herein by reference in its entirety, and by the International Telecommunication Union (ITU) in the G.992.1 (full-rate ADSL) and G.992.2 (G.lite) standards, both incorporated herein by reference in their entirety. These standards specify that hundreds of 4.3125 kHz sub-channels are assigned for DSL transmissions between a telephone company Central Office (CO) and a Remote Terminal (RT), such as a home or business. Data is transmitted between the CO and RT in both the downstream direction, i.e., from the CO to the RT, and in the upstream direction, i.e., from the RT to the CO. The aggregate bandwidth, i.e., the bandwidth that is used by both the upstream and the downstream communications, of a full-rate ADSL system is over 1 MHz and that of G.lite is over 500 kHz. The systems typically transmit 1.5 Mbps (G.lite) or 6 Mbps (full-rate ADSL) data rates downstream.

SUMMARY OF THE INVENTION

The demand for even faster data access speeds is being driven by the desire of consumers to enhance access to the Internet and services available over the Internet, such as high-bandwidth multimedia presentations, streaming video, audio, streaming audio, and the like. This increased demand in turn creates a demand for systems and technologies that are capable of operating at these increased bandwidth's. Communication systems that enable high speed data access are being developed for both wireline and wireless systems. Typically, these systems combine a highly sophisticated signal processing technique that enables multiple bits per second per hertz of bandwidth in conjunction with an operational range over wider and wider bandwidths.

For example, to cope with these demands, proposed solutions include what is known as VDSL (very high speed DSL) utilizing approximately 10 MHz of bandwidth. Utilizing more bandwidth allows an even greater potential of higher data rate services using these technologies. For example, services based upon VDSL are targeting data rates in excess of 20 Mbps downstream, and in some cases, in excess of 50 Mbps.

Another example of broadband technology is known as home networking. For home networking, technology solutions propose the use of between approximately 10 and 20 MHz of bandwidth to supply approximately 10 Mbps of throughput between multiple points within the home. Some of the media being considered for home networking are the telephone wires inside the home, electrical wires inside the home, wireless transmissions, or the like.

In general, and with reference to FIG. 1, the telephone network architecture is a star network. A central office exists in each neighborhood throughout the world that connects all the customers within a geographic location together. Many thousands or tens of thousands of telephone lines may aggregate at the central office. Equipment in the central office that is used for DSL service should thus be capable of serving multiple lines as cost-effectively and space-effectively as possible.

Multi-port solutions are based upon technology that uses a silicon architecture that can support multiple DSL lines in a single chip. Where a single port solution can support one DSL line, a multi-port solution is capable of supporting many DSL lines. By using advances in the semiconductor process technology, a single piece of silicon can support multiple lines whereas historically the same silicon can only support one line. Multi-port solutions are an example of an important part of the evolution of DSL solutions and leverage the improvements in silicon processes to create a solution that translates into, for example, cost savings and space savings for DSL service providers.

Accordingly, and in accordance with an exemplary embodiment of the invention, the first aspect of this invention is to provide an architecture that enables systems to support both multi-port standards-based DSL and broadband technologies.

Aspects of the present invention also relate to providing an architecture that scales as silicon geometry's change so that an architecture that supports x ports today can support y, where y is greater than x, ports in the future.

Aspects of the present invention also relate to providing an architecture that scales to support multiple modes of operation so that the systems and methods can evolve from supporting a predetermined number of ports of one solution or a predetermined number of ports for another solution. For example, an exemplary multiple mode embodiment may include 8 ports of DSL or 1 port of VDSL, or 2x ports of one solution or 2y ports of another solution, such as 16 ports of DSL or 2 ports of VDSL.

Aspects of the present invention also relate to providing a modem architecture that is capable of supporting both access solutions, such as DSL, cable, powerline or wireless access, or the like, and home networking solutions, such as powerline, telephone line, wireless networking, or the like.

Aspects of the present invention also relate to providing a method for operating a modem in one of number of modes of operation.

These and other features and advantages of this invention are described in, or are apparent from, the following detailed description of embodiments.

BRIEF DESCRIPTION OF THE DRAWINGS

The embodiments of the invention will be described in detail, with reference to the following figures wherein.

DETAILED DESCRIPTION OF THE INVENTION

For ease of illustration, the functions of an exemplary DSL modem have been partitioned into sections, where each section is dedicated to perform at a certain function. However, it is to be appreciated, that this division is simply for ease of illustration, and that the functional components of the modem can be regrouped or re-associated in any way as deemed appropriate. For the exemplary embodiments of this invention, the DSL modem will be broken into four functional components. First, the ATM over ADSL interface block implements the ATM transmission conversions layer as defined in the ITU I.432 standard. This interface block provides the connectivity from the ATM-Forum UTOPIA-Level II interfaces to a full duplex synchronous serial port that is typical on ADSL devices. Secondly, the framer block, which includes, for example, a framer, a coder, and interleaver blocks, implements the bit oriented functions of T1.143 and G.lite standards, such as, framing, a Cyclic Redundancy Check (CRC), scrambling, Reed-Solomon coding, and interleaving. Third, the transformation block implements the multitone QAM and trellis constellation encoding and/or decoding, Fourier transforms, and frequency-domain equalization algorithms that enable transmission and reception according to the requirements of the Full Rate and G.lite standards. Fourth, the equalization block implements the digital filtering portions of the front-end processing required in an ADSL modem. The filters perform plain old telephone system (POTS) protection, transmit mask application, interpolation, decimation, echo cancellation and time domain equalization (TDQ). Furthermore, each of these blocks is capable of supporting both transmit and receive functions simultaneously. The transmit functions implemented in these blocks are detailed in the G.992.1 and G.992.2 standards, incorporated herein by reference in their entirety. The receive functions detailed above are just a typical example of an ADSL receiver. It is to appreciated that other receiver structures are possible and that the receiver structure is not limited to that described herein.

Within each functional unit described above, there exist core engines, or functional blocks, that operate on data being processed in the modem. For example, in a single port solution, there will exist one such set of engines in each functional block. As solutions have migrated to multi-port applications, a typical solution is to populate the DSL modem architecture with multiple engines with each engine dedicated to the equivalent of one DSL line's implementation.

Figure 1:
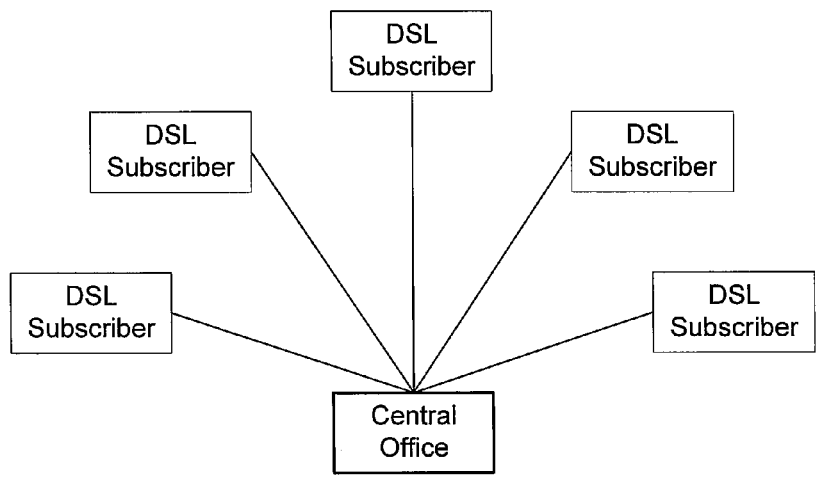
FIG. 1 is an exemplary embodiment of a star network.
Figure 2:
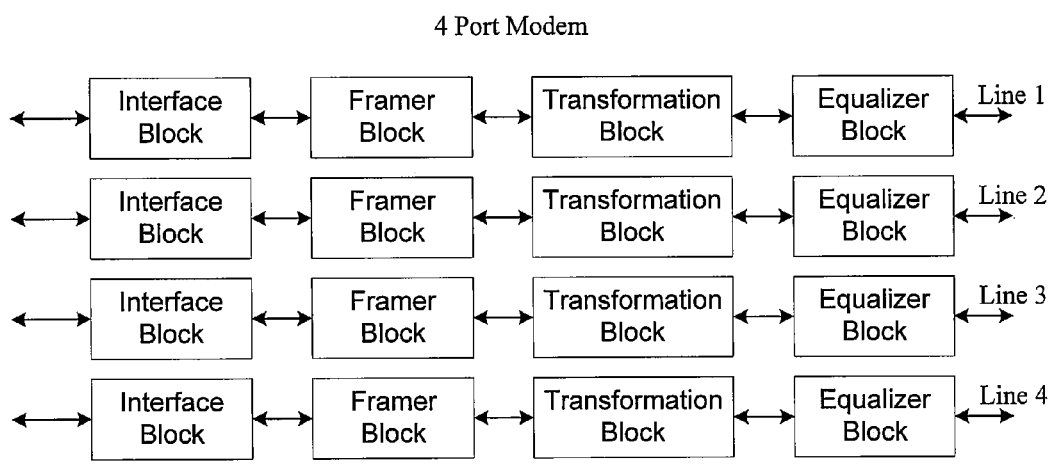
FIG. 2 is a functional block diagram illustrating an exemplary multimode multicarrier modem according to this invention.

FIG. 2 illustrates an exemplary multi-port solution that uses the partition nomenclature discussed above for a 4-port embodiment. In particular, for each port, each one of the blocks, i.e., the interface block, the framer block, the transformation block, and the equalizer block, is duplicated. However, with the exemplary embodiment illustrated in FIG. 2, the size of the resulting silicon solution, which is directly related to the number of gates required to implement the modem, becomes disadvantageously large. Since the same blocks are replicated multiple times, the size of the silicon grows as more ports are added to the modem.

According to an exemplary embodiment of this invention, modems are designed that are capable of operating at speeds that are higher than the speed required to implement a single port of DSL. Thus, one engine can be used to support the throughput of multiple engines. Therefore, by re-using the same engine multiple times, the number of gates required does not increase relative to the number of ports. Typically, as the geometry of the silicon implementation, measured in microns, decreases, the speed at which a chip can operate increases. For a factor of two improvement in silicon geometry, e.g., from 0.35 microns to 0.25 microns, a speed increase of approximately of 30% can be achieved. The result is that as silicon manufacturing processes improve, and consequently solutions proceed deeper into the sub-micron realm, the same DSL engine that in a previous geometry can only operate one port, in the new geometry according to the systems and methods of this invention allow more than one port can be supported. To provide this type of functionality, a resource manager that directs the data in and out of one or more engines and maintains information pertaining to which of the ports is being operated at any particular time is used.

Figure 3:
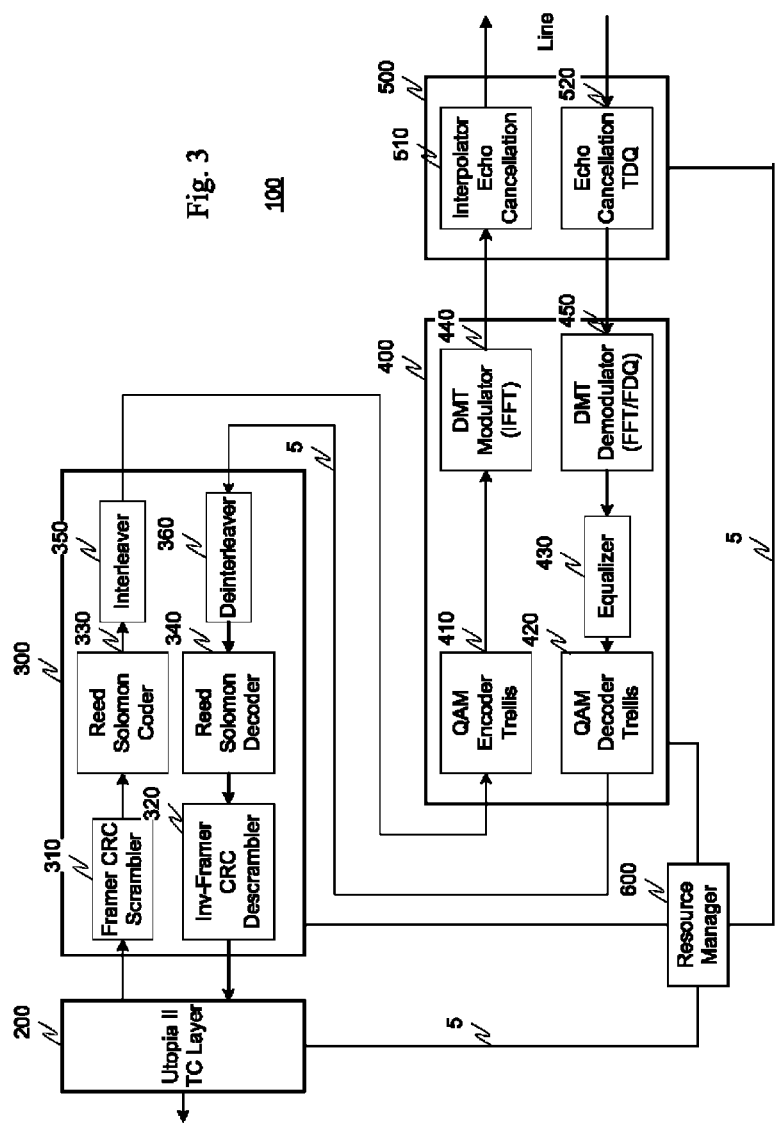
FIG. 3 is a functional blocked diagram illustrating a second exemplary embodiment of a multimode multicarrier modem according to this invention.

For example, FIG. 3 illustrates an exemplary embodiment of a multimode multicarrier modem that is capable of supporting multiple ports simultaneously. In particular, as previously discussed, the multimode multicarrier modem 100 comprises an interface block 200, a framer block 300, a transformation block 400, an equalizer block 500 and a resource manager 600, interconnected by links 5. In this exemplary embodiment, the framer 300 comprises a framer CRC scrambler 310, an inverse-framer CRC descrambler 320, a Reed Solomon Coder 330, a Reed-Solomon Decoder 340, an interleaver 350 and a deinterleaver 360. The transformation block 400 comprises a QAM encoder trellis 410, a QAM decoder trellis 420, an equalizer 430, a DMT modulator (IFFT) 440 and a DMT demodulator (FFT/FDQ) 450. The equalizer block 500 comprises an interpolator and echo cancellor 510 and an echo cancellation and time domain equalizer (TDQ) 520.

The links 5 can be a wired or a wireless link or any other known or later developed element(s) is capable of supplying and communicating electronic data to and from the connected elements.

Thus, for example, in the exemplary embodiment illustrated in FIG. 3, a multicarrier modem is capable of, for example, allocating 32 Mbps to be used to support 4 ports of 8 Mpbs ADSL or 1 port of 32 Mbps VDSL. This is accomplished by changing the operation of the resource manager 600. For example, the modifications to the resource manager 600 can be a software command that regulates the operation of the various engines and directs and maintains the input and data output from the resource manager 600. With this exemplary embodiment, the number of transistors required to implement a multi-port solution and the ability, through software commands, to configure the silicon to operate as either a multiport ADSL or, for example, a VDSL solution, is provided. Furthermore, it is also possible to configure the silicon to operate in a combination of ADSL and VDSL ports. In the example illustrated in FIG. 3, where a 32 Mbps engine is used in the example, the engine can be reconfigured to support one 8 Mbps ADSL port and two 12 Mbps VDSL ports.

In operation, the resource manager 600 comprises a memory portion and a resource multiplexing system (not shown) that is capable of managing the addressing and control functionality into and out of one or more functional blocks. Thus, depending on the service requirements, e.g., ADSL, VDSL, Home Networking, or any combination thereof, the resource manager 600, allocates for each service requirement and for each functional block determines the required frame boundaries based on the service requirement. Additionally, the resource manager 600 divides the memory portion into, for example, a number of buffers, based on the frame boundaries and configures the addressing of data read into and data written out of the buffers to the respective functional blocks.

Figure 4:
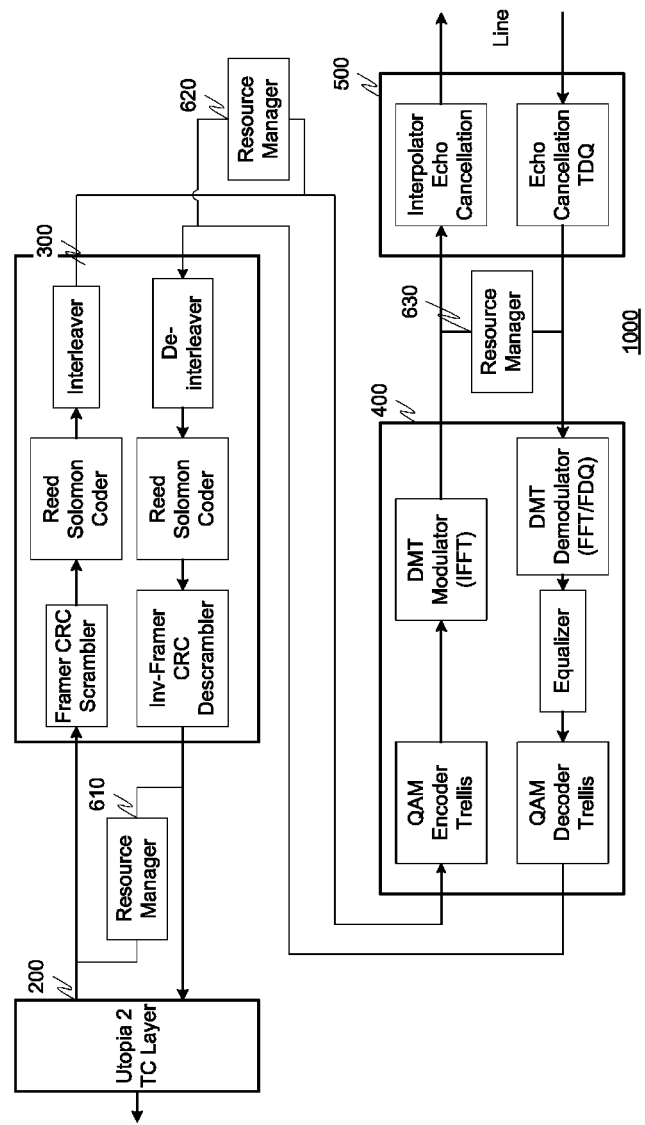
FIG. 4 is a functional blocked diagram illustrating a third exemplary multimode multicarrier modem according to this invention.

FIG. 4 illustrates an exemplary embodiment of a multimode multicarrier modem 1000 according to a second embodiment of this invention. In particular, and while similar components are referred to with similar reference numbers, the functions of the resource managers are split between one or more of the various functional blocks. For example, in this illustrative embodiment, the resource manager 610 is placed between the interface block 200 and the framer block 300. Furthermore, the resource manager 620 is placed between the framer block 300 and the transformation block 400, and the resource manager 630 is placed between the transformation block 400 and the equalizer block 500. Therefore, for this particular embodiment, the duties of the various resource managers are restricted to directing the data in and data out between two adjacent functional blocks. However, it is to be appreciated, that while the resource manager can be configured to govern all functional blocks, such as illustrated in FIG. 3, or have multiple resource managers with more specific functionality, the resource manager or resource managers, can be configured in any manner, and duplicated as many times as necessary, without affecting the overall function of the systems and methods of this invention.

Figure 5:
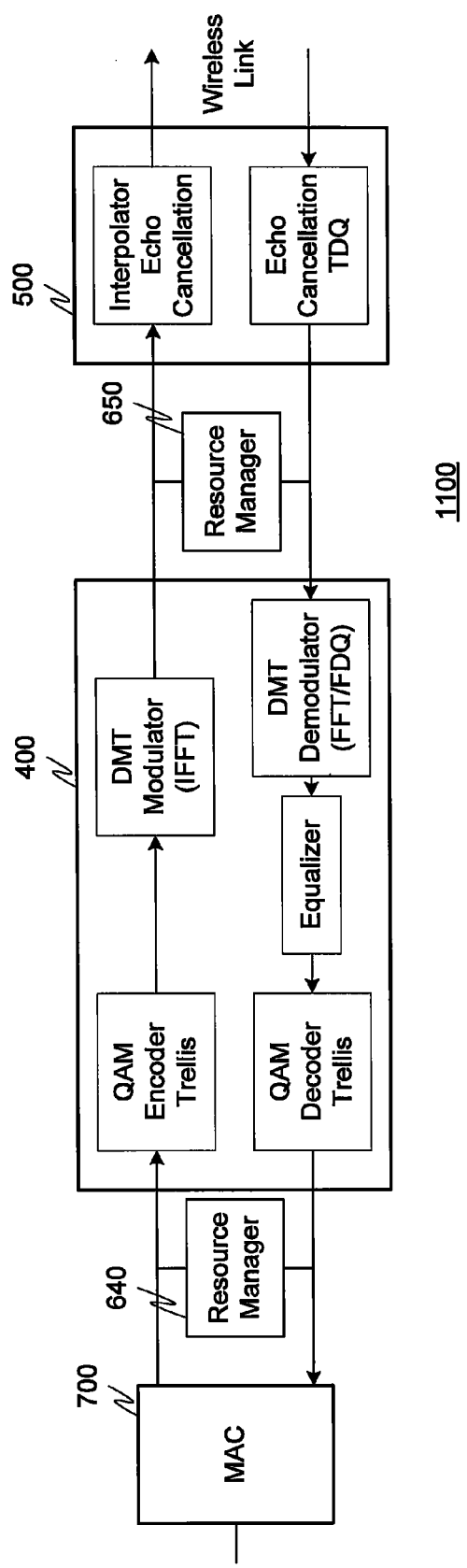
FIG. 5 is a functional block diagram illustrating a fourth exemplary multimode multicarrier modem according to this invention.

FIG. 5 illustrates that exemplary multimode multicarrier modem 1100 that can provide, for example, concurrent DSL access and home networking solutions either simultaneously, or serially. In particular, a multicarrier, e.g., DMT, based home networking solution can be partitioned into similar functional portions comparable to those discussed above. This partitioning results in a silicon architecture that consists of a very high-speed engine, or one or more engines, that can support both ADSL and home networking. In particular, the multicarrier modem 1100 comprises a MAC (media access control) functional block 700, a transformation block 400 and a equalizer block 500, with resource managers 640 and 650 interposed therebetween, respectfully. However, as discussed in relation to a previous embodiment of the multimode multicarrier modem, the resource manager 640 and 650 can be combined into one resource manager that is capable of controlling the MAC block 700, the transformation block 400 and the equalization block 500.

In operation, the resource managers 640 and 650 comprise a memory portion and a resource multiplexing system (not shown) that is capable of managing the addressing and control functionality into and out of one the MAC 700 and transformation functional blocks 400 and the transformation and equalization block 500, respectively. Thus, the resource manager 640, determines the required frame boundaries based on the service requirement. Additionally, the resource manager 640 divides a memory portion (not shown), such as a buffer, into, for example, a number of buffers, based on the frame boundaries and configures the addressing of data read into and data written out of the buffers to the respective functional blocks.

Figure 6:
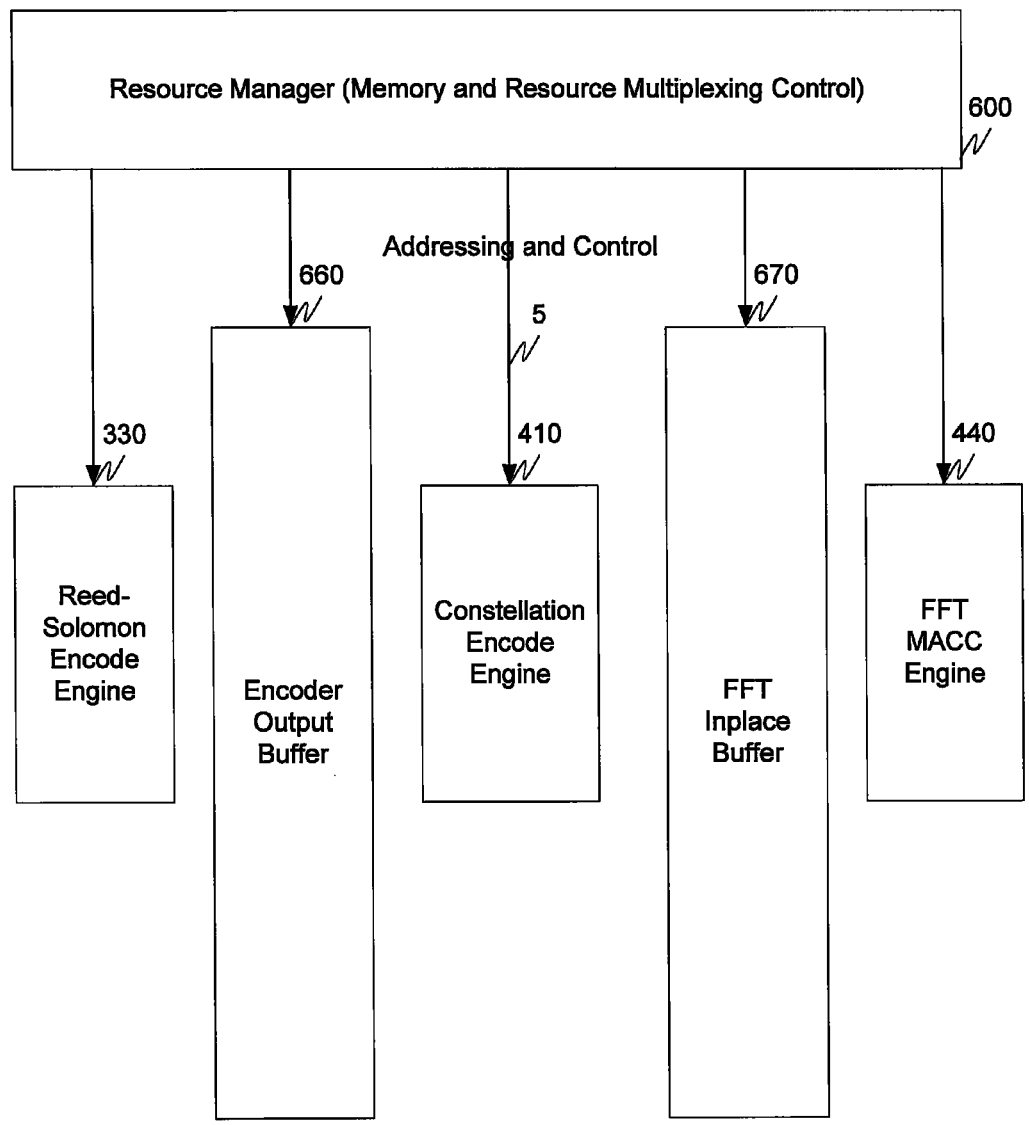
FIG. 6 is a functional blocked diagram illustrating an exemplary resource manager according to this invention.

FIG. 6 illustrates an exemplary embodiment of the various functional components of a resource manager that is used for a plurality of computational engines. In particular, the resource manager 600 comprises a memory and resource multiplexing control portion that provides the address and control functionality for the various engines in the multimode multicarrier modem. Additionally, two buffers, an encoder output buffer 660 and an inplace buffer 670 are used to temporarily store information between the associated functional blocks. As discussed above, based on the number of ports, the resource manager configures the memory portion and the multiplexing control to control the transfer of data into and out of the various functional blocks using, for example, a time slot type organizational structure.

Figure 7:
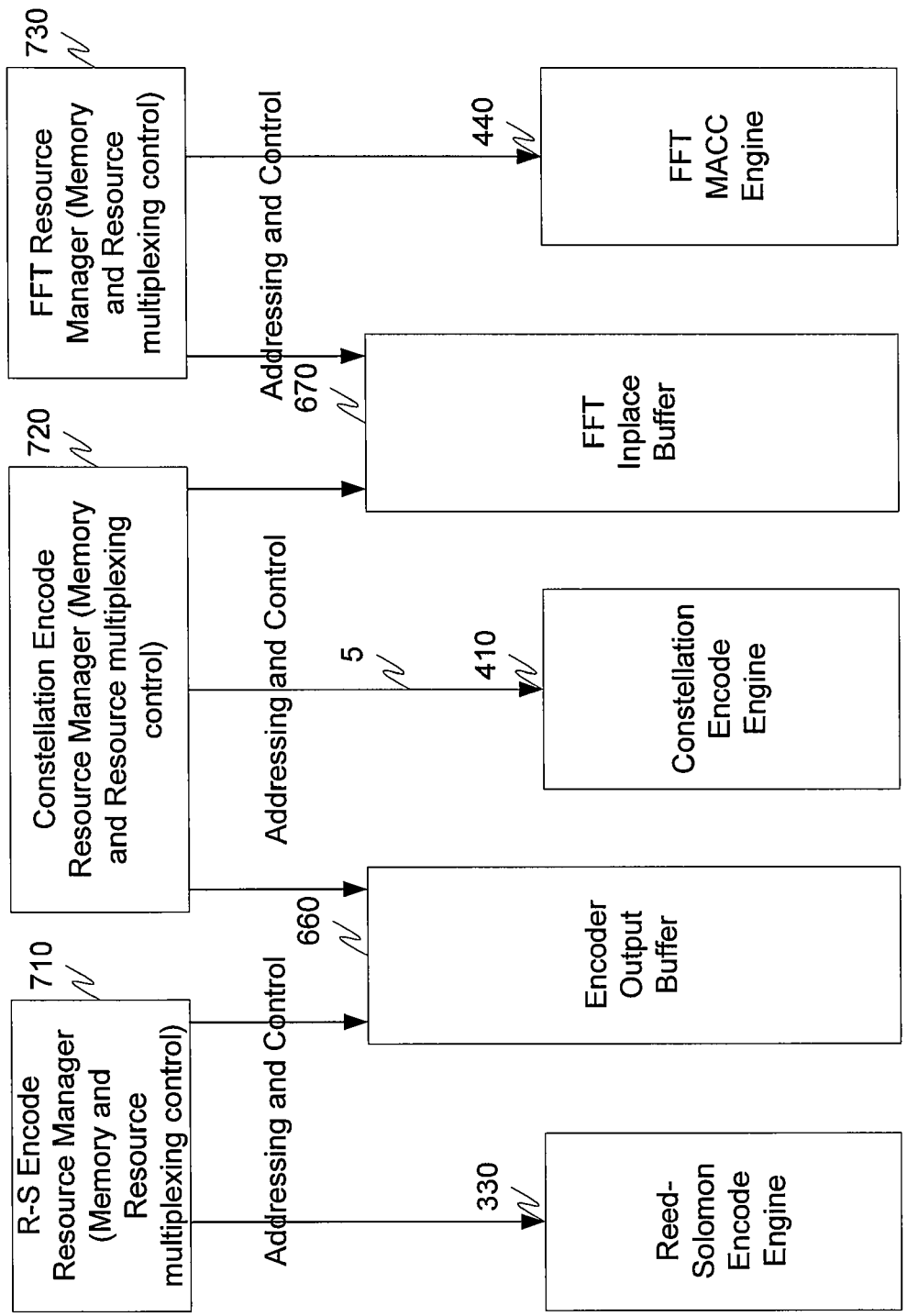
FIG. 7 is a functional blocked diagram illustrating a second exemplary resource manager according to this invention.

FIG. 7 illustrates an exemplary configuration for a plurality of resource managers where each resource manager is assigned an engine. In particular, a Reed-Solomon resource manager 710 manages the addressing and control of the Reed-Solomon encode engine with the aid of the encoder output buffer 660. Similarly, the constellation encode resource manager 720 manages the addressing and control of the constellation encode engine with the aid of the encoder output buffer 660 and the FFT inplace buffer 670. Additionally, the FFT resource manager 730 manages the addressing and control of the FFT MACC encode engine with the aid of the FFT inplace buffer 670.

Figure 8:
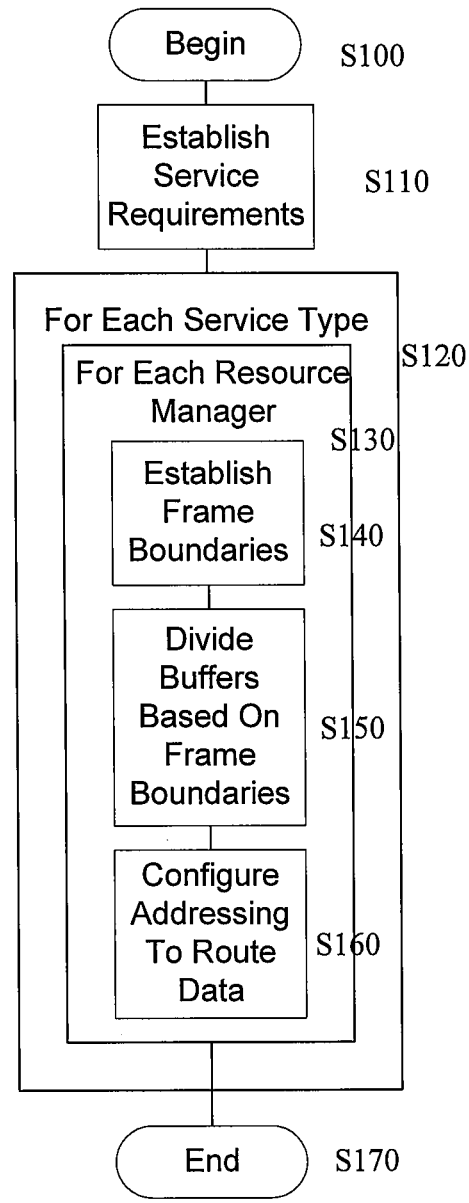
FIG. 8 illustrates the exemplary operation of a resource manager according to this invention.

FIG. 8 illustrates an exemplary method of operation of a resource manager. In particular, control begins in step S100 and continues to step S110. In step S110, the service requirements are established. For example, the modem can be configured to operate in a single, such as high speed mode, a multi-mode configuration, or any combination thereof. Next, in step S120, for each service type, the operation of resource manager is determined. Then, in step S130, for each resource manager, the frame boundaries are determined in step S140. Control then continues to step S150.

In step S150, the memory, or buffers, are divided based on the frame boundaries. Next, in step S160, the addressing of the resource manager(s) are configured to correctly route data between the various functional blocks. Control then continues to step S170 where the control sequence ends.

Figure 9:
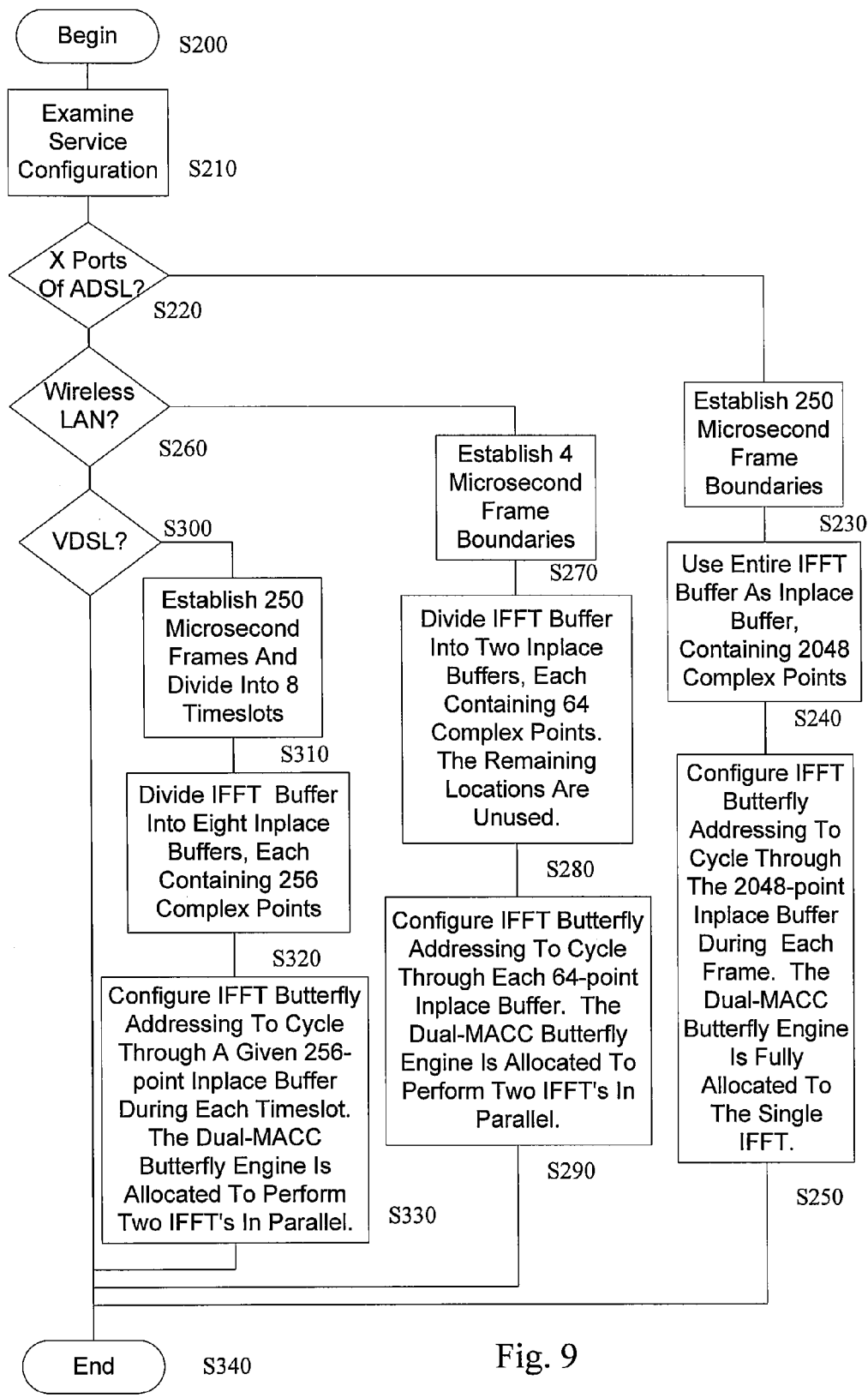
FIG. 9 illustrates a second exemplary method of operation of the resource manager according to this invention.

FIG. 9 illustrates a second exemplary method of the operation of a resource manager. In particular, control begins in step S200 and continues to step S120. In step S210, the service requirements are established. For example, the modem can be configured to operate in a single, such as high speed mode, a multi-mode configuration, or any combination thereof. Next, in step S220, a determination is made whether the modem is to be configured for ADSL multiport mode. If the modem is to be configured for ADSL multiport mode, control continues to step S230. Otherwise control jumps to step S260.

In step S230, the frame boundaries are established. Next, in step S240, a buffer is configured as an inplace buffer containing a predetermined number of points. Then, in step S250, the addressing for the buffer is configured. Control then continues to step S340.

Next, in step S260, a determination is made whether the modem is to be configured for LAN operation. If the modem is to be configured for LAN operation, control continues to step S270. Otherwise control jumps to step S300.

In step S270, the frame boundaries are established. Next, in step S280, a buffer is configured as an inplace buffer containing a predetermined number of points. Then, in step S290, the addressing for the buffer is configured. Control then continues to step S340.

Next, in step S300, a determination is made whether the modem is to be configured for VDSL operation. If the modem is to be configured for VDSL operation, control continues to step S310. Otherwise control jumps to step S340.

In step S310, the frame boundaries are established. Next, in step S320, a buffer is configured as an inplace buffer containing a predetermined number of points. Then, in step S330, the addressing for the buffer is configured. Control then continues to step S340 where the control sequence ends.

However, while the exemplary method illustrated in FIG. 9 shows the various methods being operated serially, it is to be appreciate that the various steps could also be run in parallel. For example, the multiport ADSL and VDSL steps could be performed simultaneously, for example by dedicated resource managers.

Figure 10:
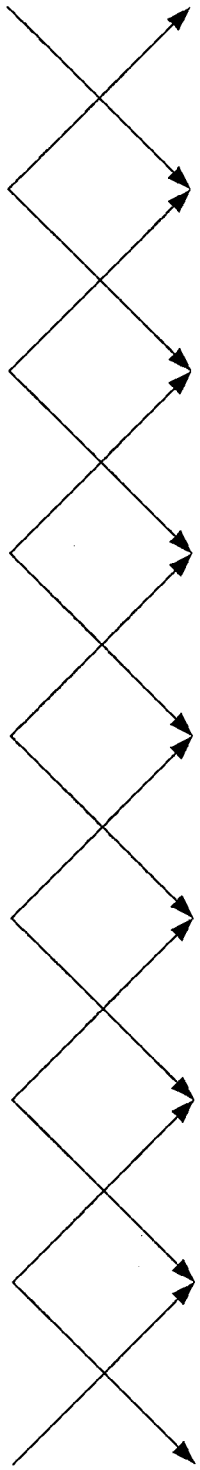
FIG. 10 illustrates the exemplary operation of an 8 port ADSL modem according to this invention.

FIG. 10 illustrates the exemplary addressing for a resource manager for a functional block where the modem is configured for 8 ports of ADSL. In particular, for each port, a 512 point FFT inplace buffer is established. The resource manager then performs 768 Multiply-accumulates per pass, addressing local to the port 1 FFT buffer. Similar operations are also performed for the remaining 7 ports.

For the exemplary 8-port example, and with reference to FIG. 10, the functional logic, which is directionally related to the numbers of gates, are required to support 8 ports of 8 Mbps ADSL is essentially equivalent to that required for one port of 64 Mbps VDSL. The number of FFT "butterfly" operations for one 8 MHz VDSL with a 4096 point FFT is only slightly larger than the number of butterflies required for 8 ports of ADSL, each utilizing 1 MHz of bandwidth. Thus, the same computational resources and the even the same memory buffers can be re-used with different addressing and logic control as managed and identified by the resource manager.

Figure 11:
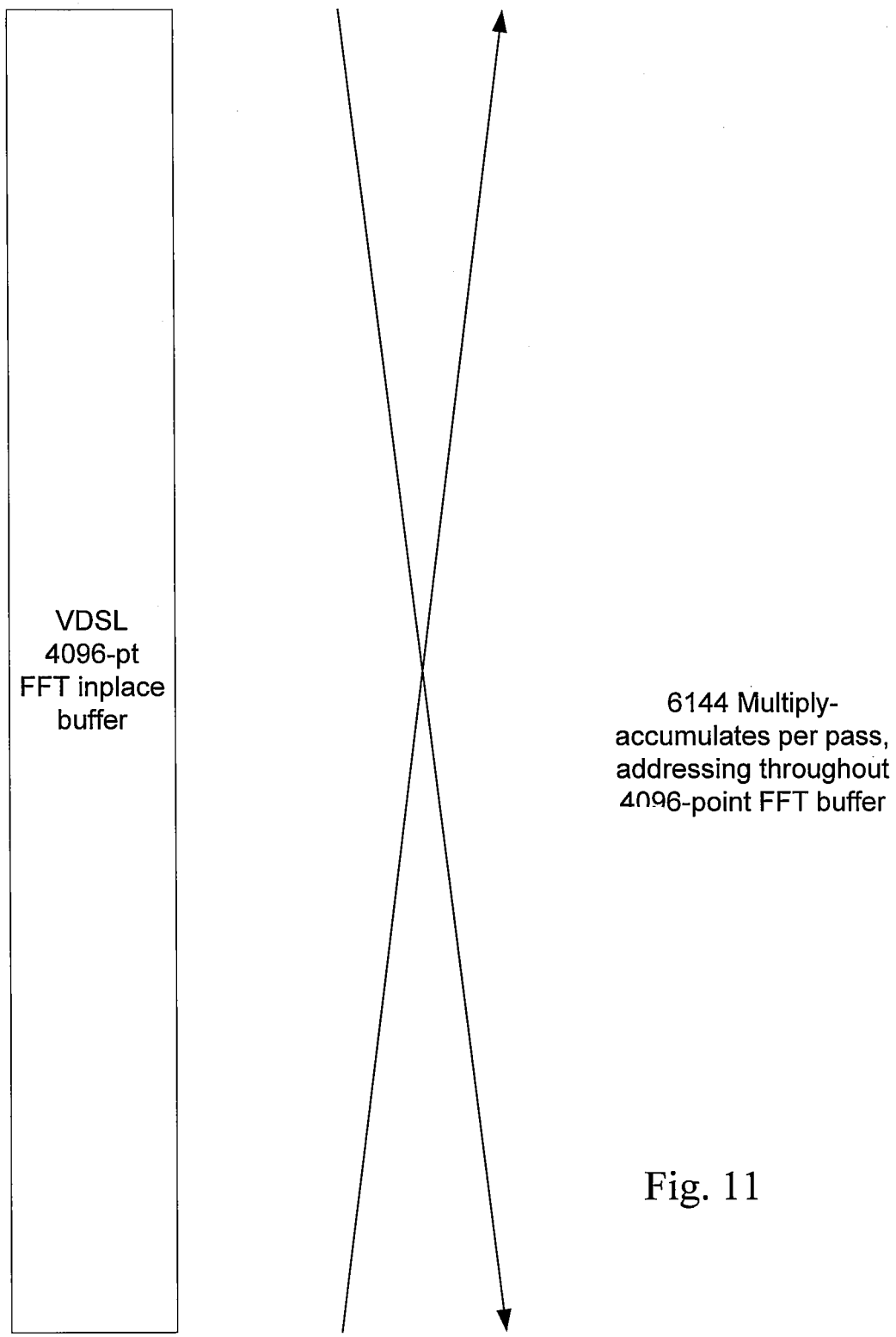
FIG. 11 illustrates the exemplary operation of a VDSL modem according to this invention.

FIG. 11 illustrates the exemplary addressing for a resource manager for a functional block where the modem is configured for 1 ports of VDSL. In particular, a 4096 point FFT inplace buffer is established. The resource manager then performs 6144 Multiply-accumulates per pass, addressing throughout the 4096 point buffer.

The above example refers to the FFT functional block that is used in the DMT transmitter and receiver. The same concept of scaling the implementation engine to support multiple applications applies to other functional blocks as well. For example, primary resources required to perform the Galois-Field operations for the two cases above, i.e., 8 ports of 8 Mbps ADSL or 1 port of 64 Mbps VDSL, are the same, i.e., 32,000 length-255 Reed-Solomon code words must be computed each second.

The multimode multicarrier engine described in this invention can be used in applications where a multicarrier engine is a fundamental element of a set of access solutions or a combination of access and networking solutions. The exemplary embodiment provides details of a multimode ADSL or VDSL solution as well as a combination mode ADSL/LAN solution. Multimode operation can also involve a selection between any of ADSL, VDSL, powerline access, i.e. transmission and reception of data over powerlines, wireless access, i.e., transmission and reception of data over the air, or cable access, i.e., transmission and reception of data over cable TV lines. As described above for ADSL or VDSL, multimode operation can also involve combinations of access techniques driven out of the multimode engine, e.g., 2 ports of ADSL and 1 port of VDSL. Also, while the exemplary embodiments discussed above illustrate a combination mode operation involving a selection of access and networking technologies and a combination ADSL/LAN operation, any combination of access, such as ADSL, VDSL, powerline, wireless or cable, and networking, such as, telephone line, powerline, wireless technologies, or the like, can also be used with comparable success.

As illustrated in FIG. 3-7, the multimode multicarrier modem and related components can be implemented either on a DSL modem, such as a VDSL modem, or separate programmed general purpose computer having a communication device. However, the multimode multicarrier modem can also be implemented in a special purpose computer, a programmed microprocessor or a microcontroller and peripheral integrated circuit element, an ASIC or other integrated circuit, a digital signal processor, a hardwired or electronic logic circuit such as a discrete element circuit, a programmable logic device, such as a PLD, PLA, FPGA, PAL, or the like, and associated communications equipment. In general, any device capable of implementing a finite state machine that is in turn capable of implementing the flow charts illustrated in FIGS. 8-9 can be used to implement the multicarrier modem according to this invention.

Furthermore, the disclosed method may be readily implemented in software using object or object-oriented software development environments that provide portable source code that can be used on a variety of computers, work stations, or modem hardware and/or software platforms. Alternatively, disclosed modem may be implemented partially or fully in hardware using standard logic circuits or a VLSI design. Other software or hardware can be used to implement the systems in accordance with this invention depending on the speed and/or efficiency requirements of this system, the particular function, and the particular software and/or hardware systems or microprocessor or microcomputer systems being utilized. The multicarrier modem illustrated herein, however, can be readily implemented in a hardware and/or software using any known later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor and associated communications equipment, a modem, such as a DSL modem, or the like. In these instances, the methods and systems of this invention can be implemented as a program embedded on a modem, such as a DSL modem, or the like. The multicarrier modem can also be implemented by physically incorporating the system and method into a software and/or hardware system, such as a hardware and software system of a modem, such as an ADSL modem, VDSL modem, network interface card, or the like.

It is, therefore, apparent that there has been provided in accordance with the present invention, systems and methods for a multimode multicarrier modem configuration. While this invention has been described in conjunction with a number of embodiments, it is evident that many alternatives, modifications and variations would be or are apparent to those of ordinary skill in the applicable art. Accordingly, applicants intend to embrace all such alternatives, modifications, equivalents and variations that are within the spirit and the scope of this invention.

What is claimed is:

1. A multiport modem comprising a plurality of ports to support a plurality of modes of operation, wherein a first mode of operation supports:
   a first port of multicarrier access communications operating concurrently with a first port of wireless communications and a first port of multicarrier LAN (local area network) communications, and
   a second mode of operation supports the one port of multicarrier access communications operating concurrently with the one port of wireless communications and a second port of multicarrier LAN communications,
   wherein the first port of multicarrier LAN communications differs from the second port of multicarrier LAN communications.

2. The modem of claim 1 wherein the multicarrier access communications is DSL.

3. The modem of claim 1 wherein the first port and second port of multicarrier LAN are for transmission and reception of data over the air.

4. The modem of claim 1 wherein first port and second port of multicarrier LAN are for transmission and reception of data over the cable TV lines.

5. The modem of claim 1 wherein the first port and second port of multicarrier LAN are for transmission and reception of data over telephone lines.

6. The modem of claim 1 wherein the first port and second port of multicarrier LAN are for transmission and reception of data over powerlines.

* * * * *